US008675585B2

(12) United States Patent
Park et al.

(10) Patent No.: US 8,675,585 B2
(45) Date of Patent: Mar. 18, 2014

(54) METHOD AND APPARATUS FOR MONITORING A DOWNLINK CONTROL CHANNEL IN A WIRELESS COMMUNICATION SYSTEM SUPPORTING MULTIPLE CARRIERS

(75) Inventors: Sung Jun Park, Gyeonggi-do (KR);
Sung Hoon Jung, Gyeonggi-do (KR);
Seung June Yi, Gyeonggi-do (KR);
Sung Duck Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 13/266,449

(22) PCT Filed: Apr. 27, 2010

(86) PCT No.: PCT/KR2010/002633
§ 371 (c)(1),
(2), (4) Date: Nov. 22, 2011

(87) PCT Pub. No.: WO2010/126273
PCT Pub. Date: Nov. 4, 2010

(65) Prior Publication Data
US 2012/0057490 A1 Mar. 8, 2012

Related U.S. Application Data

(60) Provisional application No. 61/173,181, filed on Apr. 27, 2009.

(30) Foreign Application Priority Data

Apr. 20, 2010 (KR) .................. 10-2010-0036432

(51) Int. Cl.
*H04W 4/00* (2009.01)
(52) U.S. Cl.
USPC .......................................... 370/329

(58) Field of Classification Search
USPC .............. 370/310, 310.2, 311, 313, 315, 326, 370/321, 328, 329, 330, 338, 341, 431
See application file for complete search history.

(56) References Cited

U.S. PATENT DOCUMENTS

2008/0301514 A1* 12/2008 Ma et al. ................. 714/748
2009/0092091 A1* 4/2009 Balasubramanian ......... 370/329
2011/0267957 A1* 11/2011 Du et al. ................. 370/241

OTHER PUBLICATIONS

ZTE, "Downlink data and control structure for LTE-A," R1-090084, 3GPP TSG-RAN WG1 #55bis, Jan. 2009.
Huawei, "PUCCH design for carrier aggregation," R1-090813, 3GPP TSG RAN WG1 Meeting #56, Feb. 2009.
Motorola, "Comparison of PDCCH Structures for Carrier Aggregation," R1-091326, 3GPP TSG RAN1#56bis, Mar. 2009.

* cited by examiner

*Primary Examiner* — Anh Ngoc Nguyen
(74) *Attorney, Agent, or Firm* — Lee, Hong, Degerman, Kang & Waimey

(57) ABSTRACT

The present invention relates to a wireless communication system. More particularly, the present invention discloses a method and apparatus for monitoring a downlink control channel in a wireless communication system which supports multiple carriers. According to one embodiment of the present invention, provided is a method in which a user equipment that supports carrier aggregation for performing communication through the use of a plurality of component carriers monitors a downlink control channel, wherein said method comprises the steps of: receiving, from a base station, setup information for a specific component carrier among the plurality of component carriers; starting a timer in accordance with the control signal received through the downlink control channel; and monitoring the downlink control channel through the specific component carrier and deactivating the rest of the plurality of component carriers when timer expires.

8 Claims, 9 Drawing Sheets

METHOD AND APPARATUS FOR MONITORING A DOWNLINK CONTROL CHANNEL IN A WIRELESS COMMUNICATION SYSTEM SUPPORTING MULTIPLE CARRIERS

CROSS-REFERENCE TO RELATED APPLICATIONS

This application is the National Stage filing under 35 U.S.C. 371 of International Application No. PCT/KR2010/002633, filed on Apr. 27, 2010, which claims the benefit of earlier filing date and right of priority to Korean Application No. 10-2010-0036432, filed on Apr. 20, 2010, and also claims the benefit of U.S. Provisional Application Ser. No. 61/173,181, filed on Apr. 27, 2009.

TECHNICAL FIELD

The present invention relates to a wireless communication system, and more particularly, to a method and apparatus for monitoring a downlink control channel in a wireless communication system that supports multiple carriers.

BACKGROUND ART

In a general wireless communication system, only a single carrier may be considered even though bandwidths between an uplink and a downlink are set up to be different from each other. For example, on the basis of a single carrier, a wireless communication system may be provided, in which the number of carriers constituting the uplink and the number of carriers constituting the downlink may be 1, respectively, and a bandwidth of the uplink is symmetrical to that of the downlink.

In the International Telecommunication Union (ITU), it is required that the candidate technology of the IMT-Advanced should support an extended bandwidth as compared with a wireless communication system according to the related art. However, except for some areas of the world, it is difficult to allocate frequencies of wide bandwidths. Therefore, as a technique for effectively using fragmented small bands, a carrier aggregation (bandwidth aggregation or spectrum aggregation) technique is being developed to obtain the same effect as when a band of a logically wide bandwidth is used by physically aggregating a plurality of bands in a frequency domain.

The carrier aggregation is introduced to support increased throughput, prevent the cost from being increased by a wideband RF device, and ensure compatibility with the existing system. The carrier aggregation refers to a technique of enabling data exchange between a user equipment and a base station through a plurality of groups of carriers of a bandwidth unit defined in the existing wireless communication system (LTE system in case of the LTE-A system, and IEEE 802.16e system in case of the IEEE 802.16m system). In this case, the carriers of a bandwidth unit defined in the existing wireless communication system may be referred to as component carriers (CC). For example, the carrier aggregation technique may include a technique for supporting a system bandwidth of 100 MHz by using maximum five component carriers even if one component carrier supports a bandwidth of 5 MHz, 10 MHz or 20 MHz.

If the carrier aggregation technique is used, data may be transmitted and received through several uplink/downlink component carriers. Accordingly, the user equipment may monitor and measure all the component carriers. If data are transmitted and received on all the component carriers, there is no problem. However, the user equipment performs monitoring and measurement operations for a component carrier on which data are not transmitted and received, whereby unnecessary power consumption (battery consumption) of the user equipment may be caused.

DISCLOSURE

Technical Problem

An object of the present invention devised to solve the conventional problem is to provide a method and apparatus for monitoring a downlink control channel in a wireless communication system that supports multiple carriers, in which power consumption is reduced when a user equipment monitors a plurality of component carriers.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, in a method for monitoring a downlink control channel in a user equipment that supports carrier aggregation and performs communication by using a plurality of component carriers, the method comprises the steps of receiving, from a base station, configuration information on a specific one of the plurality of component carriers; starting a timer in accordance with a control signal received through the downlink control channel; and monitoring the downlink control channel through the specific component carrier if the timer expires and deactivating the other component carriers of the plurality of component carriers.

Also, the method further comprises the step of receiving information on discontinuous reception (DRX) from the base station, and the downlink control channel may be monitored in accordance with a DRX operation.

Also, the control signal may be uplink (UL) grant or downlink (DL) assignment, and the timer may be an inactivity timer based on a DRX operation.

Also, the control signal indicates addition of a component carrier, and the timer is started by addition of the component carrier.

Also, the timer may be restarted if a new component carrier is added before the timer expires.

Also, the control signal may be received through one or more of the plurality of component carriers.

Also, the step of deactivating the other component carriers may include the steps of stopping monitoring of the control signal from the base station to the user equipment through the other component carriers; and stopping transmission of a control signal from the user equipment to the base station through the other component carriers.

Also, the control signal from the user equipment to the base station may include one or more of a channel quality indicator (CQI), a precoding matrix index (PMI), a rank indicator (RI), and a sounding reference signal (SRS).

Also, the specific component carrier may be a primary component carrier, and the other component carrier may be a secondary component carrier.

In another aspect of the present invention, in a user equipment that supports carrier aggregation and performs communication by using a plurality of component carriers, the user equipment comprises a radio resource control (RRC) layer module performing a discontinuous reception (DRX) function; a plurality of HARQ (Hybrid Automatic Repeat Request) entities respectively corresponding to the plurality of component carriers; a MAC layer module performing an operation based on the DRX function of the RRC layer module; and a physical layer module mapping a transport channel received from the HARQ entities into an uplink physical channel and transmitting the mapped data to a network, and receiving a downlink control channel from the network, wherein the MAC layer module receives configuration information on a specific one of the plurality of component carriers from the network, and starts a timer configured by the RRC layer module if the physical layer module receives a control signal from the network through the downlink control channel, and the physical layer module monitors the downlink control channel through the specific component carrier if the timer expires and deactivates the other component carriers of the plurality of component carriers.

Advantageous Effects

According to the embodiments of the present invention, a user equipment may simply monitor a specific component carrier only. Also, the user equipment may monitor a specific component carrier only by using a predetermined timer. Also, deactivation of a secondary component carrier may be indicated simply without control signaling for deactivation of the secondary component carrier. In this case, power consumption may be reduced when the user equipment monitors a plurality of component carriers.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
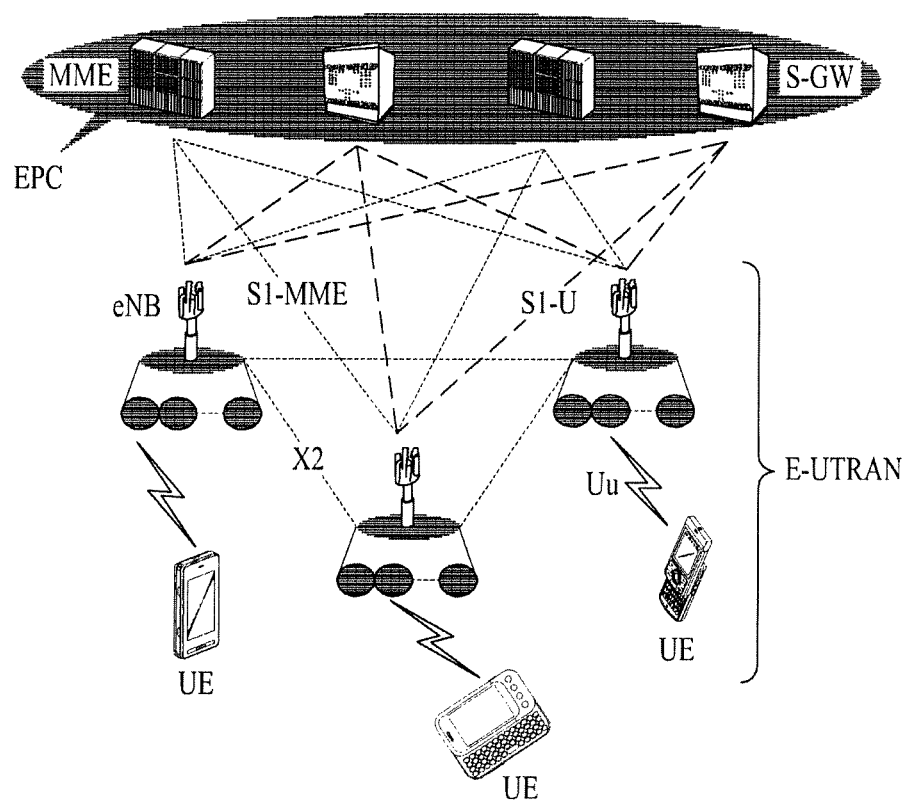
FIG. 1 is a diagram illustrating a structure of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station and a user equipment. In this case, the base station means a terminal node of a network that performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point (AP). Also, a relay device may be replaced with terms such as a relay node (RN) and a relay station (RS). Also, a terminal may be replaced with terms such as user equipment (UE), a mobile station (MS), a mobile subscriber station (MSS), and a subscriber station (SS).

Specific terminologies hereinafter described are provided to assist understanding of the present invention, and various modifications can be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE. WiMAX can be described by the IEEE 802.16e standard (WirelessMAN-OFDMA Reference System) and the advanced IEEE 802.16m standard (WirelessMAN-OFDMA Advanced system). Although the following description will be based on the 3GPP LTE standard to clarify description, it is to be understood that technical spirits of the present invention are not limited to the 3GPP LTE standard.

Structure of LTE system

FIG. 1 is a diagram illustrating a structure of an LTE system which is an example of a wireless communication system to which the present invention can be applied. The LTE system is a mobile communication system evolved from the UMTS. As shown in FIG. 1, the LTE system may be divided into E-UTRAN (Evolved UMTS Terrestrial Radio Access Network) and EPC (Evolved Packet Core). The E-UTRAN includes a user equipment (UE) and eNB (Evolved NodeB, base station). An interface between the UE and the eNB may be referred to as Uu interface, and an interface between eNBs may be referred to as X2 interface. The EPC includes a mobility management entity (MME) and a serving-gateway (S-GW), wherein the MME serves as a control plane and the serving gateway serves as a user plane. An interface between the eNB and the MME may be referred to as S1-MME interface, and an interface between the eNB and the S-SG may be referred to as S1-U interface. The S1-MME interface and the S1-U interface may be referred to as S1 interface.

Figure 2:
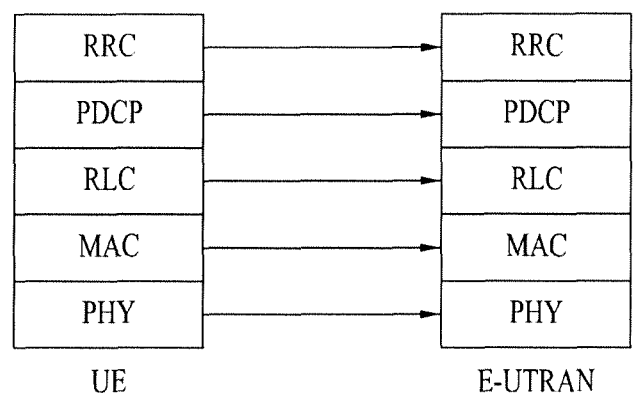
FIG. 2 is a diagram illustrating a control plane of a radio protocol.
Figure 3:
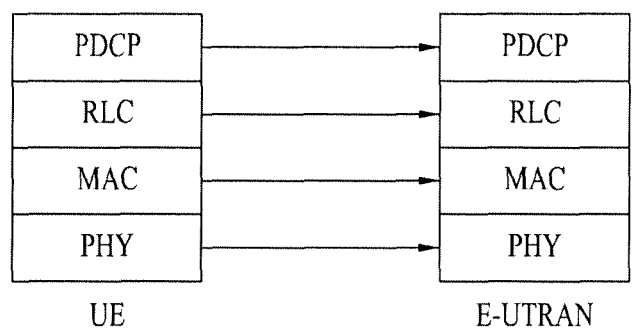
FIG. 3 is a diagram illustrating a user plane of a radio protocol.

A radio interface protocol is defined in the Uu interface which is a radio interval, and horizontally includes a physical layer, a data link layer, and a network layer, and vertically includes a user plane for data information transfer and a control plane for signaling transfer (control signal transfer). As shown in FIG. 2 and FIG. 3, the radio interface protocol may be classified into L1 (first layer) including a physical (PHY) layer, L2 (second layer) including MAC/RLC/PDCP layers, and L3 (third layer) including RRC layer, based on three lower layers of the open system interconnection (OSI) standard model widely known in the communications systems. These radio protocol layers exist in the UE and the E-UTRAN in pairs, and play a role in data transfer of the Uu interface.

The respective layers of the radio interface protocol shown in FIG. 2 and FIG. 3 will be described as follows. FIG. 2 is a diagram illustrating a control plane of a radio protocol, and FIG. 3 is a diagram illustrating a user plane of a radio protocol.

The physical (PHY) layer belonging to the first layer L1 provides an information transfer service using a physical channel. The PHY layer is connected to a medium access control (MAC) layer above the physical layer via a transport channel. Data are transferred between the medium access control layer and the physical layer via the transport channel.

At this time, the transport channel is divided into a dedicated transport channel and a common transport channel depending channel sharing. Data are transferred between one physical layer of a transmitting side and the other physical layer of a receiving side via the physical channel.

Several layers exist in the second layer. First of all, the MAC layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval. Also, the RLC layer of the second layer provides three action modes, i.e., a transparent mode (TM), an un-acknowledged mode (UM), and an acknowledged mode (AM) to ensure various quality of services (QoS) required by each radio bearer (RB). In particular, the AM RLC layer performs a retransmission function through automatic repeat and request (ARQ) function for reliable data transmission.

In order to effectively transmit data using IP packets such as IPv4 or IPv6 within a radio-communication interval having a narrow bandwidth, a PDCP (packet data convergence protocol) layer of the second layer performs header compression to reduce the size of IP packet header having relatively great size and unnecessary control information. The header compression is to increase transmission efficiency of the radio-communication interval by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, re-configuration and release of radio bearers (RBs) to be in charge of controlling the logical, transport and physical channels. In this case, the RB means a service or logical path provided by the first and second layers of the radio protocol for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a path for transmitting RRC message in the control plane, and the DRB is used as a path for transmitting user data in the user plane.

Carrier Aggregation Technique

Figure 4:
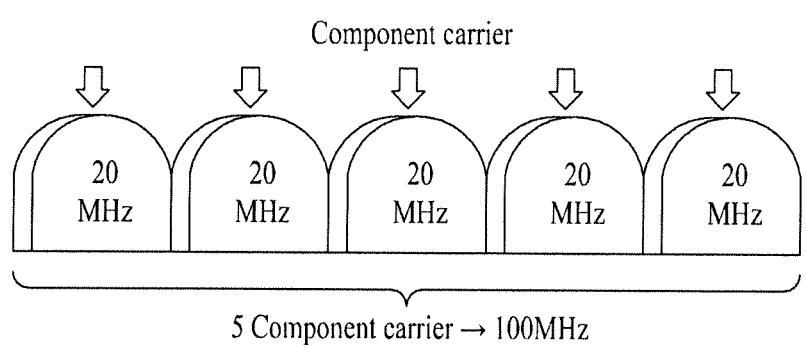
FIG. 4 is a diagram illustrating carrier aggregation.

The carrier aggregation technique that supports multiple carriers will be described with reference to FIG. 4.

As described above, the carrier aggregation technique may support a system bandwidth of maximum 100 MHz by using maximum five component carriers grouped by carriers (component carriers) of a bandwidth unit (for example, 20 MHz) defined in the existing wireless communication system (for example, LTE system).

Bandwidth sizes of the component carriers used for carrier aggregation may be the same as or different from one another.

Also, each of the component carriers has a frequency band (center frequency) different from that of the other component carriers. Although the respective component carriers may exist on a continuous frequency band, component carriers existing on a discontinuous frequency band may be used for carrier aggregation. Also, in the carrier aggregation technique, bandwidth sizes of an uplink and a downlink may be allocated symmetrically or asymmetrically.

Multiple carriers (component carriers) used for carrier aggregation may be classified into a primary component carrier (PCC) and secondary component carriers (SCC). The primary component carrier means a carrier used to exchange traffic and control signaling between the base station and the user equipment. Control signaling may include addition of component carriers, configuration for a primary component carrier, configuration for discontinuous reception (DRX), uplink (UL) grant, or downlink (DL) assignment. Although a plurality of component carriers are used by the base station, the user equipment, which belongs to the base station, may be set to have only one primary component carrier. If the user equipment is operated in a single carrier mode, the primary component carrier is used. Accordingly, all requirements required for exchange of data and control signaling between the base station and the user equipment should be fulfilled so that the primary component carrier may be used independently.

In the mean time, the secondary component carriers mean additional component carriers that may be activated or deactivated depending on data requirements transmitted and received. The secondary component carriers may be set to be used by a specific command and rule only received from the base station. Also, the secondary component carriers may be set to be used together with the primary component carrier to support additional bandwidth. A control signal such as uplink grant or downlink assignment may be received from the base station to the user equipment through the activated secondary component carriers, and a control signal through an uplink, such as a channel quality indicator (CQI), a precoding matrix index (PMI), a rank indicator (RI), and a sounding reference signal (SRS) may be transmitted from the user equipment to the base station.

Resource allocation to the user equipment may be performed in the range of a primary component carrier and a plurality of secondary component carriers. In a multiple carrier aggregation mode, the system may allocate the secondary component carriers to the user equipment asymmetrically to the downlink and/or the uplink, on the basis of system load (that is, static/dynamic load balancing), peak data rate, or service quality request.

In use of the carrier aggregation technique, configuration for the component carriers is provided from the base station to the user equipment after RRC connection procedure. RRC connection means that the user equipment is allocated with a radio resource on the basis of RRC signaling exchanged between RRC layer of the user equipment and a network through SRB. After RRC connection procedure of the user equipment and the base station is performed, the user equipment may receive configuration information on the primary component carrier and the secondary component carriers from the base station. The configuration information on the secondary component carriers may include addition/deletion (or activation/deactivation) of the secondary component carriers. Accordingly, in order to activate the secondary component carriers between the base station and the user equipment or deactivate the existing secondary component carriers, exchange of RRC signaling and MAC control elements is required.

Activation or deactivation of the secondary component carriers may be determined by the base station on the basis of quality of service (QoS), load condition of carriers, and the other factors. The base station may indicate the user equipment to configure the secondary component carriers by using a control message that includes information such as indication type (activation/deactivation) on the downlink/uplink and a list of secondary component carriers.

Uplink/Downlink L2 Structure Considering Carrier Aggregation Technique

Figure 5:
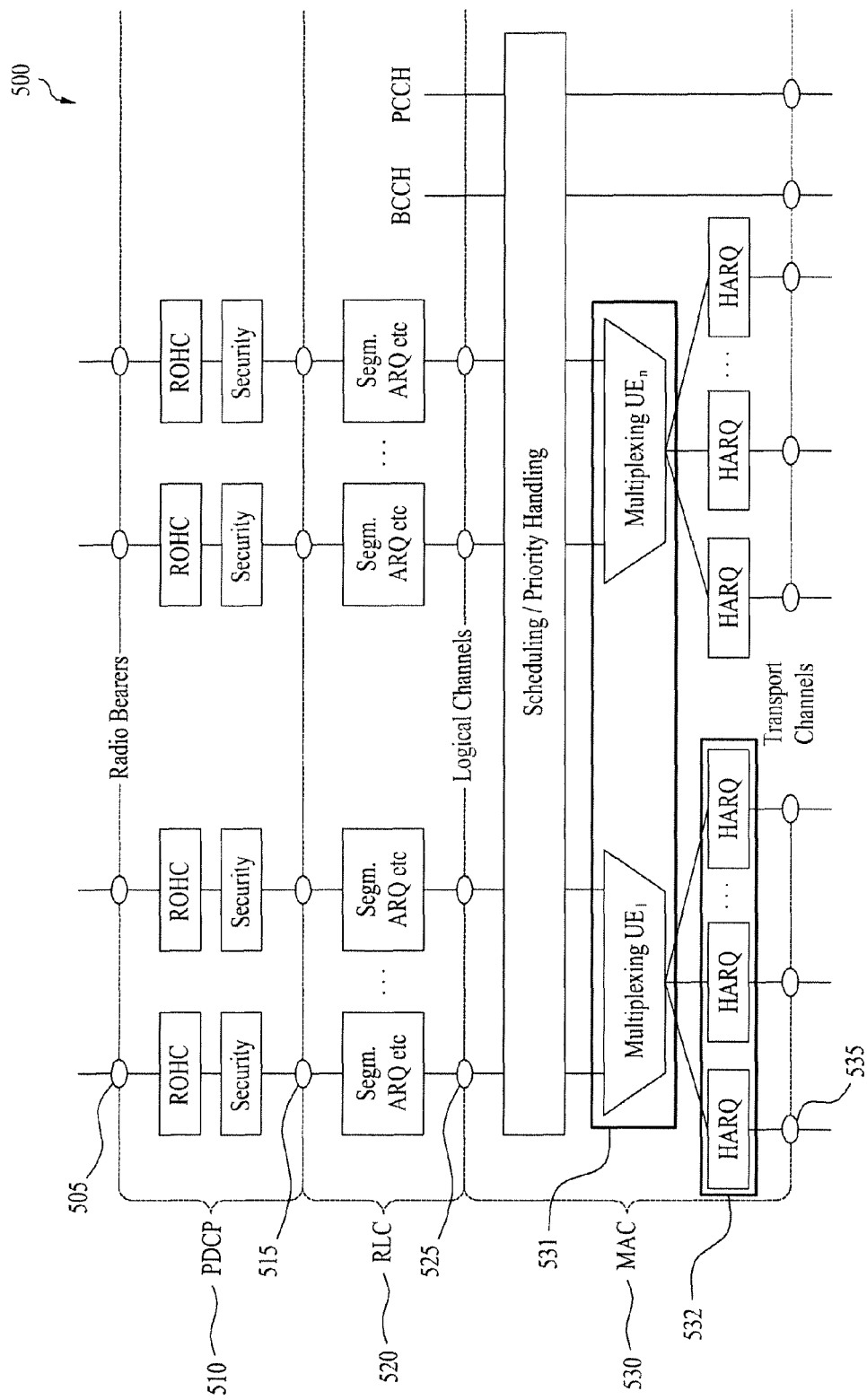
FIG. 5 is a diagram illustrating a structure of a downlink second layer (L2) in carrier aggregation.
Figure 6:
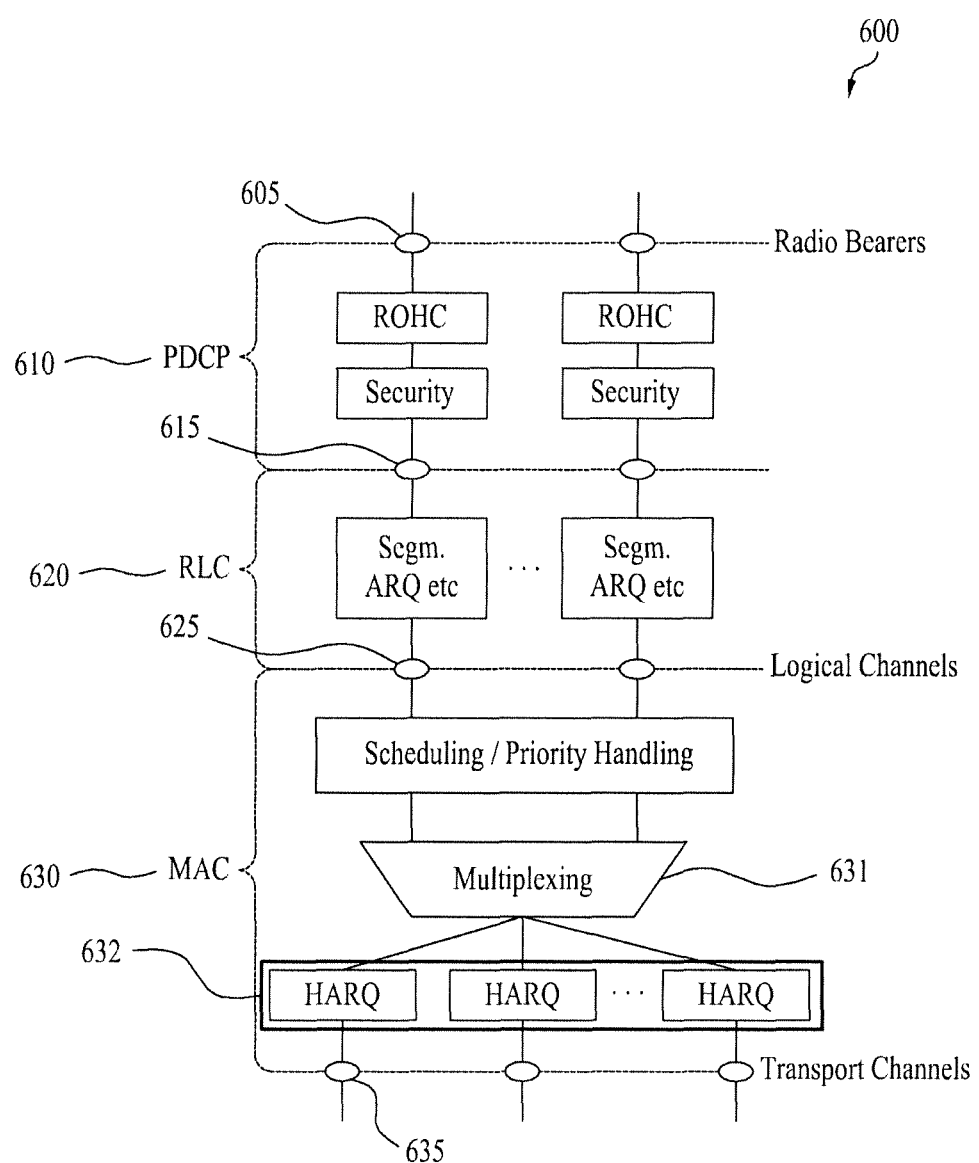
FIG. 6 is a diagram illustrating a structure of an uplink second layer (L2) in carrier aggregation.

A structure of L2 (second layer) considering the carrier aggregation technique will be described with reference to FIG. 5 and FIG. 6. FIG. 5 is a diagram illustrating a structure of a downlink second layer (L2) in carrier aggregation, and FIG. 6 is a diagram illustrating a structure of an uplink second layer (L2) in carrier aggregation.

In a downlink L2 structure 500 of FIG. 5, a PDCP layer 510, an RLC layer 520, and a MAC layer 530 are shown. In FIG. 5, elements 505, 515, 525 and 535 in circles in interfaces between the respective layers represent service access points (SAP) for peer-to-peer communication. The SAP between a PHY channel (not shown) and a MAC layer provides a transport channel (535), and the SAP between a MAC layer and an RLC layer provides a logical channel (525). A normal operation of the respective layers is the same as above.

The MAC layer multiplexes a plurality of logical channels (i.e., radio bearers) from the RLC layer. In the downlink L2 structure, a plurality of multiplexing entities 531 of the MAC layer are related to application of a multiple input multiple output (MIMO) technique. In a system that does not consider the carrier aggregation technique, since one transport channel is generated by multiplexing a plurality of logical channels in case of non-MIMO, one hybrid automatic repeat and request (HARQ) entity is provided to one multiplexing entity (531) (not shown).

Meanwhile, in a system that considers the carrier aggregation technique, a plurality of transport channels corresponding to a plurality of component carriers are generated from one multiplexing entity 531. In this case, in the carrier aggregation technique, one HARQ entity 532 manages one component carrier. Accordingly, the MAC layer 530 of the system that supports the carrier aggregation technique provides a plurality of HARQ entities 532 to one multiplexing entity 531 and performs operations related to the plurality of HARQ entities. Also, since each HARQ entity 532 processes a transport block independently, it may simultaneously transmit and receive a plurality of transport blocks through a plurality of component carriers.

In an uplink L2 structure 600 of FIG. 6, the same operation as that of the downlink L2 structure 500 of FIG. 5 is performed except that one multiplexing entity 631 is included in one MAC layer 630. In other words, a plurality of HARQ entities 632 are provided for a plurality of component carriers, and operations related to the plurality of HARQ entities 632 are performed by the MAC layer 630, and a plurality of transport blocks may be transmitted and received through the plurality of component carriers.

Discontinuous Reception (DRX)

Discontinuous reception (DRX) will be described with reference to FIG. 7.

Discontinuous reception relates to an operation as to when the base station transmits information on allocation of a radio resource to the user equipment in performing communication between the base station and the user equipment. If the user equipment always monitors a downlink channel transmitting information related to radio resource allocation, specially a physical downlink control channel (PDCCH), a problem occurs in that power consumption is caused. Accordingly, in order to solve this problem, the base station transmits the radio resource allocation information to the user equipment through the PDCCH at a specific time only and the user equipment receives the radio resource allocation information through the PDCCH at the specific time only, in accordance with a rule previously designated between the user equipment and the base station. Accordingly, the user equipment monitors the PDCCH at the specific time only, whereby power consumption may be reduced.

Figure 7:
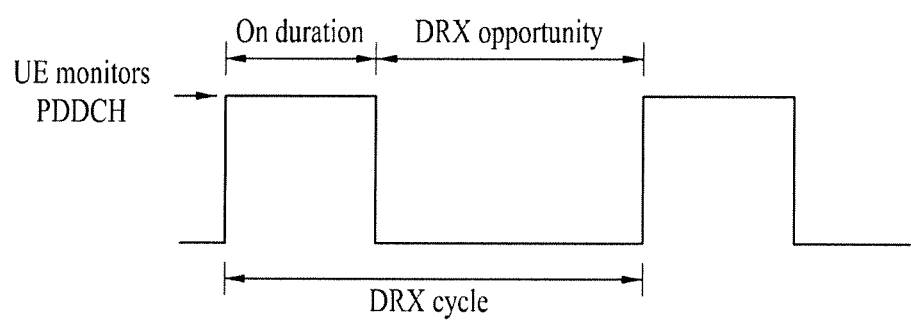
FIG. 7 is a diagram illustrating a discontinuous reception (DRX) cycle.

FIG. 7 is a diagram illustrating a discontinuous reception (DRX) cycle. In FIG. 7, the user equipment monitors the PDCCH for an on duration period, and a DRX cycle specifies a repetition cycle of on duration followed by a deactivation cycle.

In the LTE system, discontinuous reception includes a long DRC cycle and a short DRX cycle. The reason why that the two DRX cycles are used is to minimize transmission latency of data and maximize battery saving of the user equipment by appropriately using the long DRC cycle and the short DRX cycle depending on a transmission status of the data. For example, in case of Internet browsing, power saving performed for a short time while a web page is being loaded may correspond to the short DRX cycle, and power saving based on absence of data received until a user clicks another page after viewing one page corresponds to the long DRX cycle.

In the discontinuous reception action, an active time is defined. The active time means the time when the user equipment should monitor the PDCCH transmitted to the downlink by turning on its reception module. Since the user equipment does not need to monitor the PDCCH for the time other than the active time, it may reduce power consumption by turning off its reception module.

The active time includes the time when an on duration timer, a DRX-inactivity timer, a DRX retransmission timer or a contention resolution timer is operated.

The on duration timer designates the number of consecutive PDCCH subframes at the start point of the DRX cycle.

The DRX-inactivity timer designates the number of consecutive PDCCH subframes after the PDCCH indicating initial uplink or downlink user data transmission for the user equipment is successfully decoded.

The DRX retransmission timer designates the maximum number of consecutive PDCCH subframes for retransmission as soon as the user equipment predicts downlink retransmission.

The contention resolution timer designates the number of consecutive PDCCH subframes for the time when the user equipment monitors the PDCCH within the PDCCH subframe after a message 3 (MSG 3) is transmitted. The MSG 3 is a message transmitted through an uplink shared channel (UL-SCH) that includes C-RNTI (Cell-Radio Network Temporary Identity) MAC (Medium Access Control) CE (Control Element) or CCCH (Common Control Channel) SDU (Service Data Unit), is provided from the upper layer, and is associated with user equipment contention resolution.

The PDCCH subframe represents a random subframe in case of the user equipment operated in a frequency division duplex (FDD) mode, and represents a subframe only that includes a downlink subframe and a downlink pilot time slot (DwPTS) in case of the user equipment operated in a time division duplex (TDD) mode.

Also, the active time includes a pending time of a scheduling request procedure, i.e., a standby time of uplink grant after scheduling request transmission.

Also, the active time includes the time when uplink grant for HARQ retransmission can be transmitted, in respect of uplink HARQ transmission.

Also, the active time includes the time when uplink grant for new initial transmission indicated by C-RNTI or T-C-RNTI (Temporary C-RNTI) is received after a message 2 (MSG 2) of a random access procedure is received.

Meanwhile, if a DRX function is set, the user equipment performs next action per TTI (Transmission Time Interval).

The user equipment operates the on duration timer when the short DRX cycle is used and a remainder value obtained by dividing [(SFN*10)+subframe number] by a short DRX cycle value is equal to a DRX start offset value or when the long DRX cycle is used and a remainder value obtained by dividing [(SFN*10)+subframe number] by a long DRX cycle value is equal to the DRX start offset value.

In this case, SFN represents a system frame number, and one frame includes ten subframes, wherein the SFN becomes a reference of the absolute time within a cell.

If a hybrid automatic repeat request (HARQ) round trip time (RTT) timer expires at the second subframe and the corresponding HARQ buffer is not decoded successfully, the DRX retransmission timer is operated.

If a DRX command (DRX MAC CE) is received, the on duration timer or the inactivity timer is stopped.

When the inactivity timer expires or the DRX command is received, if the short DRX cycle is set, a DRX short cycle timer is driven to use the short DRX cycle. If the short DRX cycle is not set, the long DRX cycle is used.

If the DRX short cycle timer expires, the long DRX cycle is used.

The user equipment monitors the PDCCH for the active time (excluding uplink transmission of a half-duplex user equipment or measurement gap). If downlink assignment is received or a subframe having configured DL assignment is received, the user equipment drives the HARQ RTT timer or stops the DRX retransmission timer for the corresponding process.

If the PDCCH indicates new transmission, the user equipment drives or re-drives the DRX inactivity timer.

Discontinuous Reception Operation in Carrier Aggregation

Figure 8:
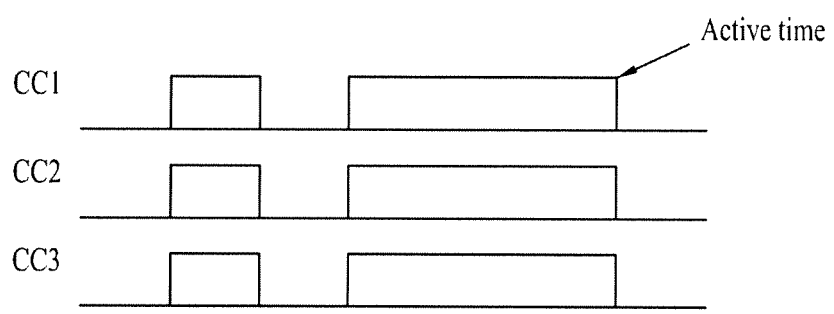
FIG. 8 is a diagram illustrating a method for managing discontinuous reception (DRX) based on a common active time in carrier aggregation.

Discontinuous reception (DRX) operation in carrier aggregation will be described. FIG. 8 is a diagram illustrating a method for managing discontinuous reception (DRX) based on a common active time in carrier aggregation.

In the carrier aggregation technique, the user equipment equally applies the DRX operation to all the component carriers. As shown in FIG. 8, the user equipment manages all the component carriers (for example, CC1, CC2 and CC3) set to itself by using one common active time, and monitors all the component carriers to receive a control signal from the base station at the active time. And, the user equipment may not try to receive the control signal by turning off a reception module, so as to reduce its power consumption at the time other than the active time.

In this respect, it may not be required depending on types of traffic that the user equipment monitor all the component carriers set to itself to receive the control signal from the base station at the active time. For example, in case of a real-time voice service such as voice over Internet protocol (VoIP), since traffic little occurs, the user equipment may sufficiently transmit or receive data to and from the base station through a specific component carrier. In other words, it is sufficient that the user equipment monitors a specific component carrier only to receive the control signal depending on a type of service, and the user equipment may not need to monitor the other component carriers. Accordingly, if the user equipment monitors all the component carriers at the active time, power consumption of the user equipment may be increased.

In this respect, the present invention suggests that the user equipment transmits and receives data to and from the base station by using only a part of a plurality of component carriers based on the carrier aggregation technique if a specific condition is satisfied.

Figure 9:
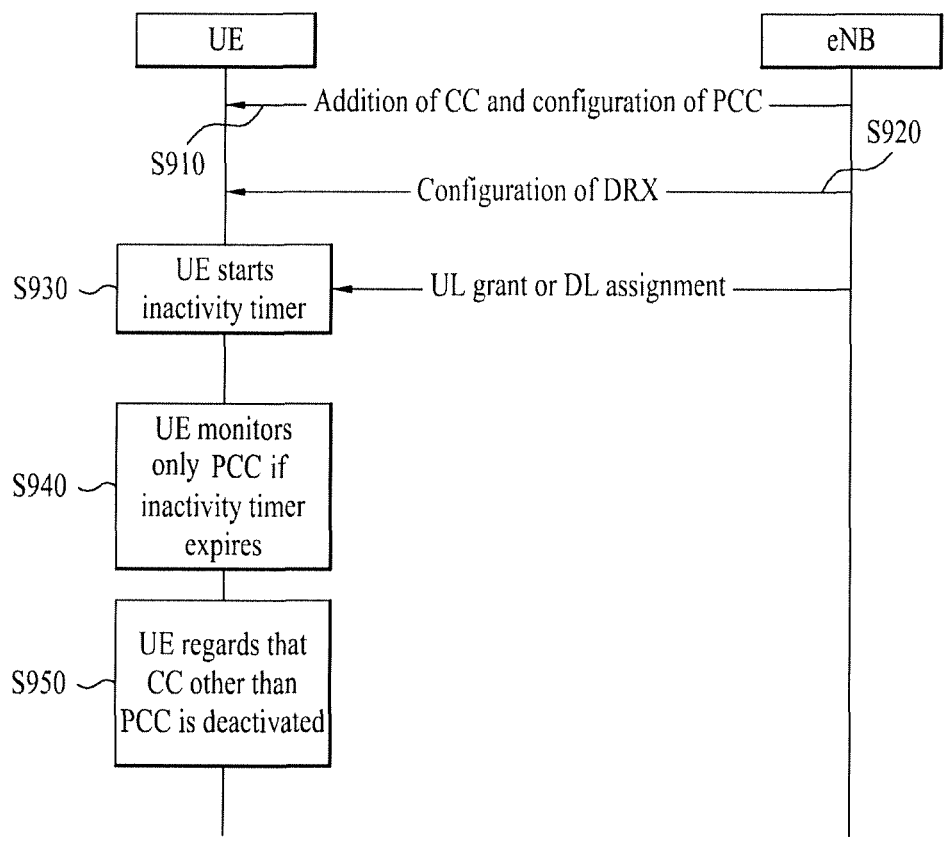
FIG. 9 is a diagram illustrating operations of a user equipment and a base station in a method for monitoring a downlink control channel in accordance with one embodiment of the present invention.

Detailed operations of the user equipment (UE) and the base station (eNB) according to the present invention will be described with reference to FIG. 9. FIG. 9 is a diagram illustrating operations of a user equipment and a base station in a method for monitoring a downlink control channel in accordance with one embodiment of the present invention.

The user equipment that supports the carrier aggregation technique may receive a message for indication of addition (activation) of a component carrier and for configuration of a primary component carrier from the base station (S910). Indication of addition of a component carrier may be performed if additional bandwidth is required for data transmission between the user equipment and the base station. Meanwhile, in a state that a plurality of component carriers are configured between the base station and the user equipment, the base station may provide indication of deleting (deactivating) a part of the plurality of component carriers to the user equipment in respect of a service that does not require a wide bandwidth. In the embodiment of the present invention, it is assumed that the plurality of component carriers are configured between the base station and the user equipment after addition and/or deletion of the component carrier is performed at the step S910.

In the mean time, in respect of configuration for the primary component carrier, the base station may provide indication of configuring a specific one of the plurality of component carriers as a primary component carrier to the user equipment (S910). If configuration for the primary component carrier is not provided from the base station, it is assumed that the user equipment continues to maintain configuration for the existing primary component carrier.

The base station provides information required for the DRX operation to the user equipment (S920). Although the step S920 of DRX is performed after the step S910 in FIG. 9, the step S920 may be performed before the step S910.

The DRX operation of the related art has been equally applied to all the component carriers as described above. In other words, as shown in FIG. 8, the user equipment monitors all the component carriers CC1, CC2 and CC3 to receive the control signal from the base station at the active time.

However, since the DRX operation is that the user equipment monitors the control signal (or control channel) from the base station at a time period which is previously defined, the user equipment unnecessarily monitors the component carriers (for example, secondary component carriers) other than the primary component carrier if the control signal is provided from the base station through a specific component carrier (for example, primary component carrier), whereby unnecessary power consumption is caused.

Accordingly, the present invention suggests that the user equipment monitors a specific component carrier (primary component carrier) only to receive the control signal from the base station from the time when the DRX operation is configured.

Next, if the user equipment receives the control signal such as uplink grant or downlink assignment from the base station while performing the DRX operation, it starts an inactivity timer in accordance with the DRX operation (S930). The control signal such as uplink grant or downlink assignment may be received through a random one of the plurality of component carriers set to the user equipment. In other words, the control signal may be received through a random one of the primary component carrier and the secondary component carriers.

As described above, the inactivity timer designates the number of consecutive PDCCH subframes after the PDCCH indicating new uplink or downlink user data transmission for the user equipment is successfully decoded. The inactivity timer may start in accordance with the designated value, and may expire in accordance with the aforementioned DRX operation (S940).

According to the DRX operation of the related art, if the inactivity timer expires, the DRX operation is performed in accordance with the DRX cycle (short/long DRX cycle). Also, since the user equipment manages all the component carriers (for example, CC1, CC2 and CC3) set to itself by using one common active time, it monitors all the component carriers to receive the control signal from the base station at the active time. However, the present invention suggests that the user equipment is set to monitor a specific component carrier (primary component carrier) only to receive the control signal from the base station if the inactivity timer expires (S940). In other words, the user equipment does not monitors the component carrier (secondary component carrier) having a frequency different from that of the specific component carrier (primary component carrier). As a result, since the user equipment monitors the specific component carrier (primary component carrier) only, additional battery consumption of the user equipment may be avoided.

Additionally, in the present invention, if the inactivity timer expires, it is determined that the secondary component carriers are deactivated (S950). Accordingly, the user equipment does not perform the monitoring operation for receiving the control signal from the base station, on the secondary component carrier, and stops a transmission operation of the control signal (CQI, PMI, RI, SRS, etc.) to the base station.

Figure 10:
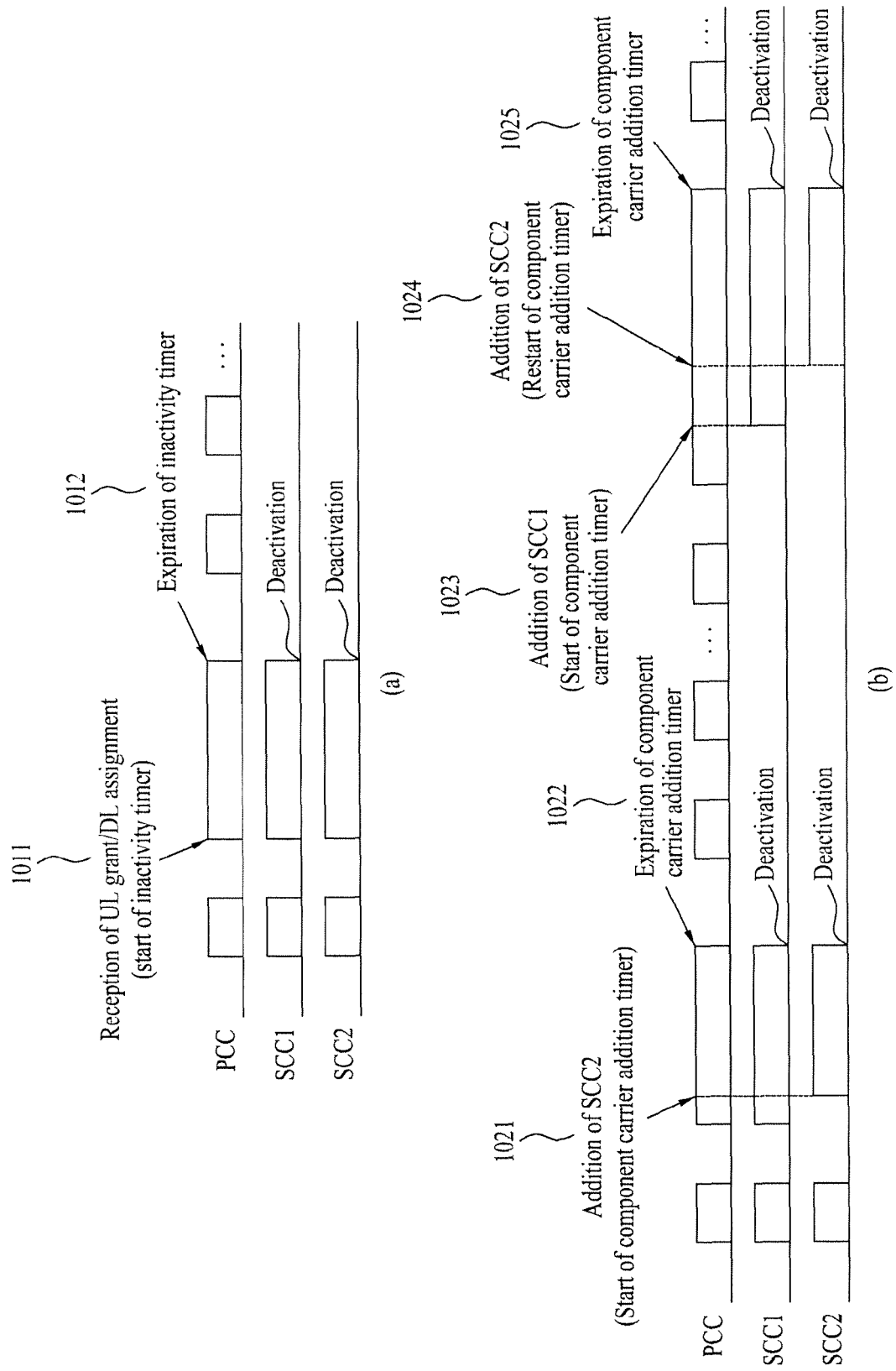
FIG. 10 is a diagram illustrating a method for managing discontinuous reception (DRX) in a method for monitoring a downlink control channel in accordance with one embodiment of the present invention.

The DRX operation according to the present invention in the carrier aggregation technique that uses a primary component carrier (PCC) and a secondary component carrier (SCC) will be described with reference to FIG. 10. FIG. 10(a) and FIG. 10(b) are diagrams illustrating a method for managing discontinuous reception (DRX) in a method for monitoring a downlink control channel in accordance with one embodiment of the present invention.

FIG. 10(a) relates to a method for not performing unnecessary component carrier monitoring using the inactivity timer described with reference to FIG. 9. If the user equipment receives uplink grant or downlink assignment from the base station through the primary component carrier, the inactivity timer is started (S1010). If the inactivity timer expires (S1012), the user equipment monitors the control signal through the primary component carrier but determines that the secondary component carriers are deactivated, without monitoring the control signal through the secondary component carriers.

FIG. 10(b) relates to a method for defining a new timer in accordance with another embodiment of the present invention, instead of using the inactivity timer described with reference to FIG. 9. In this embodiment, the timer newly defined by the base station may be referred to as a component carrier (CC) addition timer. The base station sets a value of the component carrier addition timer and notifies the user equipment of the value, and the user equipment starts the component carrier addition timer if a new component carrier (SCC2) is added (1021). If the component carrier addition timer expires in accordance with the set value (1022), monitoring for the primary component carrier is only performed (i.e., monitoring for the secondary component carriers is not performed). Also, no control signal from the user equipment to the base station is transmitted through the secondary component carriers, and it is determined that the secondary component carriers are deactivated.

Also, as the SCC1 is added, the component carrier addition timer is started (1023), and if the new component carrier SCC2 is added while the component carrier addition timer is being operated, the component carrier addition timer is restarted (1024). If the component carrier addition timer expires (1025), monitoring for the primary component carrier is only performed, and it is determined that the secondary component carriers are deactivated.

The user equipment to which a plurality of component carriers are set in accordance with the present invention monitors a specific component carrier (primary component carrier) to receive the control signal if a specific timer (inactivity timer or component carrier addition timer) expires, and deactivates the other component carriers (secondary component carriers), whereby power consumption of the user equipment, which is caused by unnecessary monitoring, may be reduced. Also, the user equipment may deactivate the secondary component carriers through a simple procedure by using a specific timer without RRC and/or MAC control signaling for deactivation of the secondary component carriers. Accordingly, unlike deactivation of the component carriers through RRC and/or MAC control signaling, the user equipment may deactivate unnecessary component carriers quickly and simply.

Hereinafter, an example of a wireless communication system that includes a user equipment and a base station according to the present invention will be described.

FIG. 6 illustrates a structure of an uplink L2 (second layer) in carrier aggregation as described above. The user equipment according to the embodiment of the present invention supports the carrier aggregation technique that performs communication by using a plurality of component carriers, and a processor of the user equipment may include layer modules corresponding to the respectively layers shown in FIG. 6.

The user equipment may include a radio resource control (RRC) layer module, a MAC layer module, and a physical layer module.

The RRC layer module may control logical, transport and physical channels in association with configuration, reconfiguration and release of the radio bearers (RBs). In this case, the user equipment may define features of a channel and a radio protocol layer required to provide a specific service, and may configure detailed parameters and operation method of the channel and the radio protocol layer. Also, the RRC layer module may configure a DRX function.

The MAC layer module may serve to perform logical channel multiplexing to map various logical channels into various transport channels and map several logical channels into one transport channel. Also, the MAC layer module may include a plurality of HARQ entities respectively corresponding to a plurality of component carriers and may perform an operation based on the configuration of the DRX function of the RRC layer module.

The physical layer module may provide an information transmission service to its upper layer by using the physical channel, and may transmit and receive data to and from the MAC layer module through the transport channel. Also, the physical layer module of the user equipment may control transmission and reception of data and a control signal through the physical channel (control channel and/or data channel) based on a radio resource between the physical layer of the user equipment and the physical layer of the network (base station). In more detail, the physical layer module may map the transport channel received from the HARQ entity of the MAC layer to the uplink physical channel and transmit the mapped data to the network, and may receive a downlink control channel (PDCCH) and/or a downlink data channel (PDSCH) from the network.

In the user equipment according to one embodiment of the present invention, the MAC layer module of the user equipment receives configuration information on a specific one of a plurality of component carriers. If the physical layer module receives the control signal from the network through the downlink control channel, the MAC layer module of the user equipment starts the timer configured by the RRC layer module. And, if the timer expires, the physical layer module may be configured to monitor the downlink control channel through the specific component carrier and deactivate the other component carriers.

Figure 11:
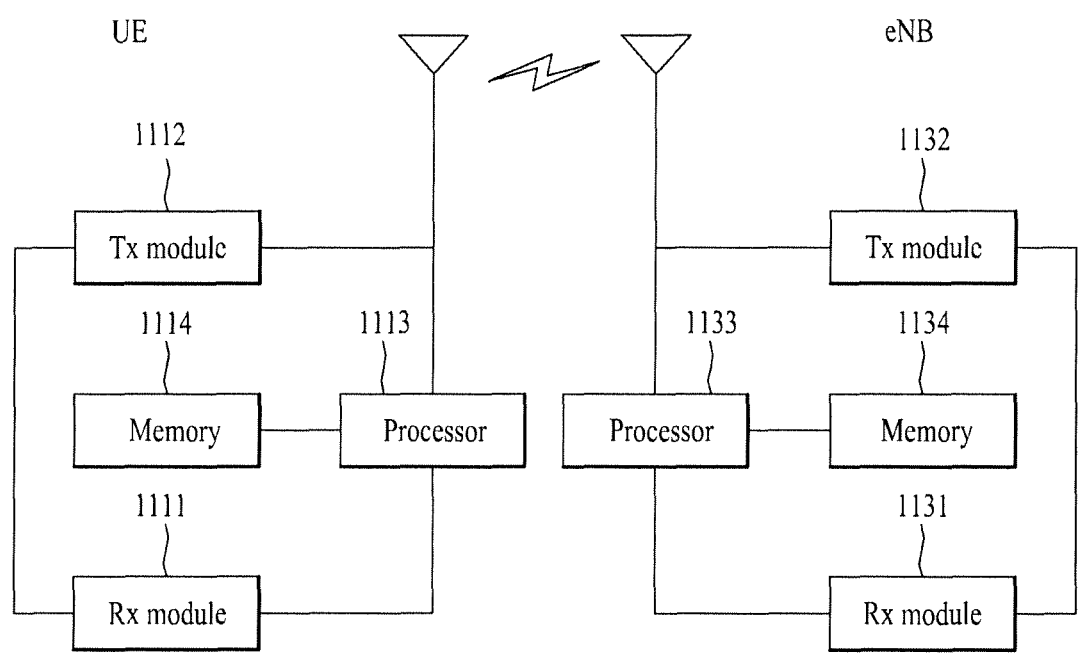
FIG. 11 is a diagram illustrating a wireless communication system that includes a user equipment and a base station, according to the preferred embodiment of the present invention.

FIG. 11 is a diagram illustrating a wireless communication system that includes a user equipment and a base station, according to the preferred embodiment of the present invention.

Referring to FIG. 11, the user equipment (UE) may include a reception module 1111, a transport module 1112, a processor 1113, and a memory 1114. The reception module 1111 may receive various signals, data and information from the base station. The transport module 1112 may transmit the various signals, data and information to the base station.

The processor 1113 may control the reception module 1111 to receive configuration information on a specific one of a plurality of component carriers from the base station. Also, the processor 1113 may control the user equipment to start the timer in accordance with the control signal received through the downlink control channel, and may monitor the downlink control channel through the specific component carrier if the timer expires and deactivate the other component carriers except for the specific component carrier.

In addition, the processor 1113 may perform an operation processing function for information received in the user equipment and information to be transmitted to the outside, and the memory 1114 may store the operation-processed information for a predetermined time and may be replaced with an element such as a buffer (not shown).

In the mean time, the base station (eNB) may include a reception module 1131, a transport module 1132, a processor 1133, and a memory 1134. The reception module 1131 may receive various signals, data and information from the user equipment. The transport module 1132 may transmit the various signals, data and information to the user equipment.

The processor 1133 may control the transport module 1131 to transmit configuration information on a specific one of a plurality of component carriers to the user equipment and transmit a control signal indicating that the user equipment starts the timer, through the downlink control channel. If the timer expires, the downlink control channel is monitored through the specific component carrier and the other component carriers are deactivated.

In addition, the processor 1133 may perform an operation processing function for information received in the user equipment and information to be transmitted to the outside, and the memory 1134 may store the operation-processed information for a predetermined time and may be replaced with an element such as a buffer (not shown).

The embodiments according to the present invention may be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent that the aforementioned detailed description according to the preferred embodiments of the present invention can be carried out by those skilled in the art. It is to be understood by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Those skilled in the art will appreciate that the present invention may be carried out in other specific ways than those set forth herein without departing from the spirit and essential characteristics of the present invention. The scope of the invention should be determined by reasonable interpretation of the appended claims and all change which comes within the equivalent scope of the invention are included in the scope of the invention. It is also obvious to those skilled in the art that claims that are not explicitly cited in each other in the appended claims may be presented in combination as an embodiment of the present invention or included as a new claim by a subsequent amendment after the application is filed.

Industrial Applicability

The aforementioned embodiments of the present invention can be applied to various mobile communication systems.

The invention claimed is:

1. A method for monitoring a downlink control channel in a user equipment that supports carrier aggregation performing communication using a plurality of component carriers, the method comprising:
receiving, from a base station, configuration information on a specific one of the plurality of component carriers;
starting a first timer in accordance with a control signal received through the downlink channel;
starting a second timer in response to an addition of a component carrier when the control signal indicates the addition of the component carrier;
monitoring the downlink control channel through the specific component carrier when both the first timer and the second time expire; and
deactivating the other component carriers of the plurality of component carriers,
wherein the second timer is received from the base station, and
wherein the second timer is different from the first timer.

2. The method according to claim 1, further comprising receiving information on discontinuous reception (DRX) from the base station, wherein the downlink control channel is monitored in accordance with a DRX operation.

3. The method according to claim 1, wherein:
the control signal is an uplink (UL) grant or a downlink (DL) assignment; and
the first timer is an inactivity timer based on a DRX operation.

4. The method according to claim 1, wherein the control signal is received through one or more of the plurality of component carriers.

5. The method according to claim 1, wherein deactivating the other component carriers includes:
stopping monitoring of the control signal from the base station to the user equipment through the other component carriers; and
stopping transmission of a the control signal from the user equipment to the base station through the other component carriers.

6. The method according to claim 5, wherein the control signal from the user equipment to the base station includes at least a channel quality indicator (CQI), a precoding matrix index (PMI), a rank indicator (RI), or a sounding reference signal (SRS).

7. The method according to claim 1, wherein the specific component carrier is a primary component carrier, and the other component carriers are secondary component carriers.

8. A user equipment that supports carrier aggregation for performing communication using a plurality of component carriers, the user equipment comprising:
a radio resource control (RRC) layer module configured to perform a discontinuous reception (DRX) function;
a plurality of Hybrid Automatic Repeat Request (HARQ) entities, each of the HARQ entities corresponding to a component carrier of the plurality of component carriers;
a medium access control (MAC) layer module configured to perform an operation based on the DRX function of the RRC layer module; and
a physical layer module configured to map a transport channel received from the HARQ entities into an uplink physical channel, transmit the mapped data to a network, and receive a downlink control channel from the network,
wherein the MAC layer module is further configured to:
receive configuration information on a specific one of the plurality of component carriers from the network, and to start a first timer configured by the RRC layer module if the physical layer module receives a control signal from the network through the downlink control channel; and
start a second timer in response to an addition of a component carrier when the control signal indicates the addition of the component carrier,
wherein the physical layer module is further configured to:
monitor the downlink control channel through the specific component carrier if both the first timer and the second timer expire; and
deactivate the other component carriers of the plurality of component carriers,
wherein the second timer is received from the base station, and
wherein the second timer is different from the first timer.

* * * * *